United States Patent [19]
John et al.

[11] Patent Number: 5,246,304
[45] Date of Patent: Sep. 21, 1993

[54] FRAMING SYSTEM

[76] Inventors: Trevor R. John, 14 Hague Place, Birkenhead, Auckland; Alan L. Beszant, 4 Kegworth Place, Browns Bay, Auckland, both of New Zealand

[21] Appl. No.: 746,784

[22] Filed: Aug. 15, 1991

[30] Foreign Application Priority Data

Aug. 23, 1990 [NZ] New Zealand .................. 235023

[51] Int. Cl.⁵ .............................................. F16B 7/00
[52] U.S. Cl. ...................................... 403/403; 403/231
[58] Field of Search ................ 403/403, 205, 231, 402

[56] References Cited

U.S. PATENT DOCUMENTS

| | | | |
|---|---|---|---|
| 4,011,706 | 3/1977 | Dupree | 403/231 |
| 4,318,628 | 3/1982 | Mancini | 403/231 |
| 4,421,434 | 12/1983 | Magner | 403/403 X |
| 4,477,990 | 10/1984 | Buchanan | 403/403 X |
| 4,702,638 | 10/1987 | Zalesak | 403/403 |
| 5,076,736 | 12/1991 | Grewe et al. | 403/250 X |

Primary Examiner—Randolph A. Reese
Assistant Examiner—Anthony Knight
Attorney, Agent, or Firm—Dellett, Smith-Hill and Walters

[57] ABSTRACT

A framing system is disclosed made of frame members and joint members. The frame members are of U-section and the ends are inserted into and imprisoned in the open ends of the joint members which are L-shaped, T-shaped, V-shaped, X-shaped or Y-shaped. The joint members are paired polystyrene mouldings which close together with a friction fit but which can be prised apart with a screwdriver. Assembled frames can be interconnected by link members inserted into the joint members. The linkage permits the construction of folding frames and boxes. Pictureframing, panelling, shopfitting and special exhibit work are disclosed.

13 Claims, 4 Drawing Sheets

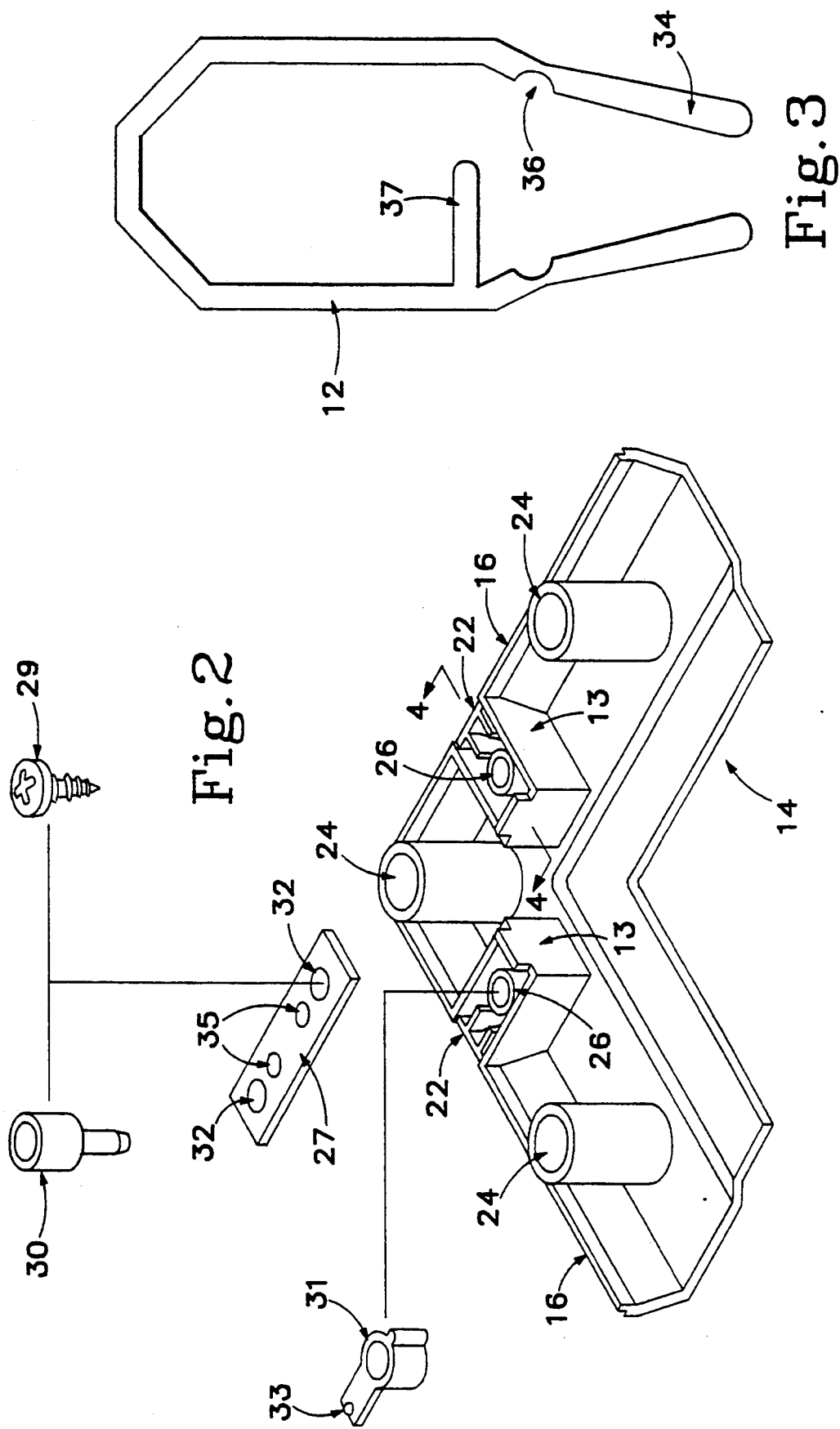

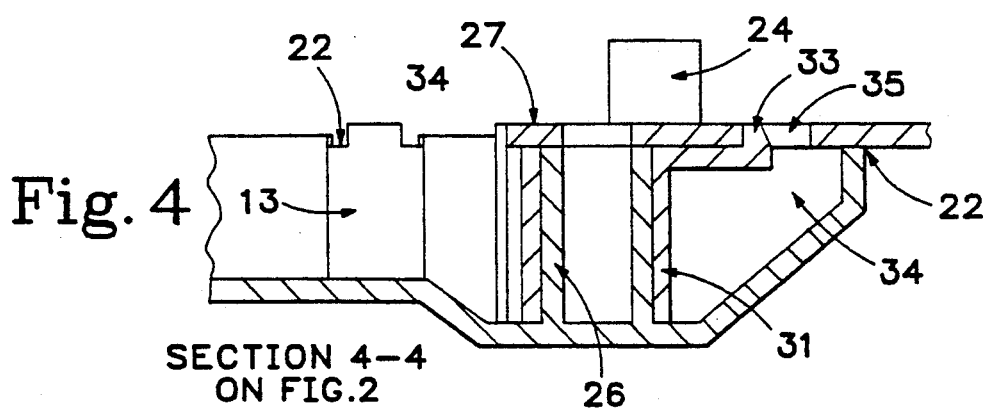
Fig. 4
SECTION 4-4 ON FIG.2
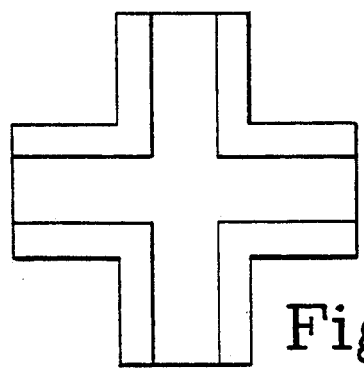
Fig. 5a
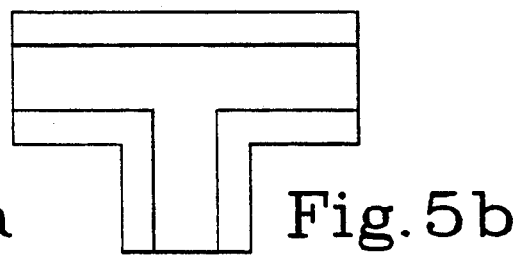
Fig. 5b
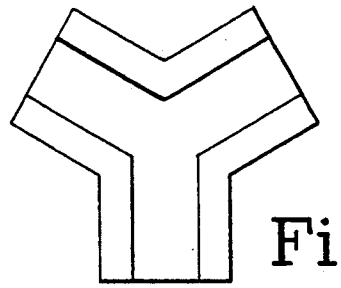
Fig. 5c
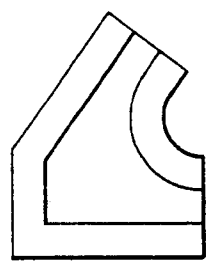
Fig. 5d
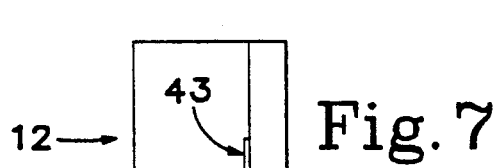
Fig. 7
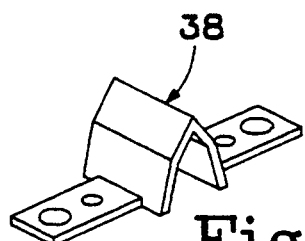
Fig. 6a
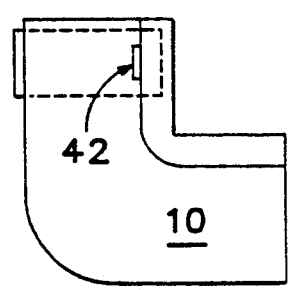
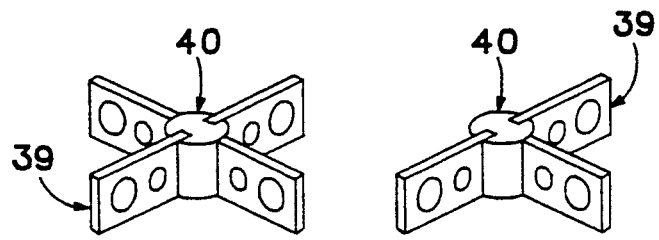
Fig. 6b    Fig. 6c

FRAMING SYSTEM

BACKGROUND OF THE INVENTION

1. Field of the Invention

This invention concerns a method and apparatus for forming frames and framework inter alia for panelling, shelving, sales displays, shopfitting, plinths, enclosures, point of sale aids, structures for exhibitions, mirrors, stage sets, photoframing, signage, extensions to buildings and frames for filters. When the invention is used as an edging then paper, card, artboard, building board, sheet plastic, sheet metal, expanded metal and glass are all suitable.

2. Description of the Prior Art

Mitred frames in softwood and aluminium are widely employed for picture and photoframing. A mitre joint requires precision in marking out, execution and subsequent assembly and any discrepancy is at once apparent. A mitre joint is usually butted and consequently needs a support structure. Half lap mitres are only feasible in timber. Otherwise the butted frame must be fixed from the rear to a stable usually plain-lapped rectangular frame and all high class framing use this technique.

The latter construction is no use for metal frames. The mitred parts are instead grooved continuously around the outer edge and four machined L-aluminium corner braces are screwed into the groove with self tapping screws. Adaptation for display work involves releasing two corners, sliding into the groove a pair of tube embracing plastic grips, refitting both corners and snapping the grips onto the tube.

Boards such as artboard bearing pictures can be mounted in channel section plastic extrusions which are joined along the longitudinal edge by an integral hinge line. This allows two flat displays to stand say at 90 degrees but there is no means for ensuring that the extrusion maintains a tidy continuous border around the work.

SUMMARY OF THE INVENTION

This invention comprises a joint member for joining together two frame members the joint member comprising a pair of similarly shaped side members arranged substantially parallel to each other, each side member having at least one inturned edge so that the inturned edges of the two side edges mutually engage, one end edge of a side member cooperating with the corresponding end edge of the another side member to form a second opening for an end of a second elongate frame member, the side members cooperating with each other to form means for receiving and locating each frame member when the member has been inserted.

The side members may mutually cooperate to form engaging means which engage and secure each frame member in the requisite location. Such means may comprise lugs directed inwardly from both side members to capture the frame member end. The lugs may be posts which coaxially overlap when the side members close together.

At least one of the side members has an internal stop for the inserted frame member. At least one of the side members has a gap in the inturned edge to enable a link member to be inserted into the joint member in order to link it to a second joint member and there may be a link receptor behind the gap within the joint member.

The link receptor may comprise a link guide, a link support and a link stop. The link support may be capable of receiving a fastener which pierces the side member and optionally the link also and may pierce a support surface enabling the support surface to be mounted. The link guide may be a pair of transverse walls which constrain the link to enter and leave at 90 degrees to the inturned edge. The link support may be capable of receiving a link retainer, the retainer being of a material with memory having a part intended to engage the link support and a part which deflects out of the path of the incoming link and retains the link until the link is retracted to deflect the retainer, such insertion and retraction being possible while the joint member remains closed.

The link support may be a boss and the retainer has a part which embraces the boss and has a tooth which engages a complementary part of the link thereby preventing unintentional retraction and resultant separation of paired frames. It would be preferable to incorporate the retainer in the structure of the joint member but the latter is made of polystyrene or other relatively brittle polymer so it is more practical to mould a separate retainer from a suitable polymer such as acetal. The provision of a pathway with a small clearance only ensures that the link presents to the tooth and is captured.

The side members may be L-shaped, T-shaped, X-shaped Y-shaped or V-shaped and moulded in plastic, ceramic, fibreglass or rubber; cast or machined in metal; rolled in sheet metal or machined from wood or wood products.

The frame members used with the joint members may be substantially U-shaped extrusions. The extrusion may have a ledge projecting transversely into the lumen of the extrusion which acts as a stop for flat items inserted edgewise into the extrusion. Preparing the frame member for use with the joint requires only checking that the end is square and then punching through both walls of the extrusion to create aligned bores which fit over the joint member posts.

The links are used in pairs to connect two frames. The links may be a flat strip of flexible plastic with a tongue at each end for insertion in the gap of each joint member. The tongues may each have a cavity or bore with which the tooth engages. Instead the link may comprise a flexible hinge section or a sheet metal fitting of Y,T,X or straight section. The latter impose permanent geometry on a cluster of frames.

In use a panel is inserted into the extrusions, the corner or other joints are applied and the appropriate fasteners are applied. For notice boards covered by transparent acetate or the like, corner triangles of acetate may be nipped under the corner joints and a sheet of acetate placed over the notice and tucked under the triangles. The notice may be changed by easing the sheet from under one corner triangle and repositioning.

In an alternative joint member the inserted ends of the frame members are not captured by the posts that is by means inside the joint member. Instead the sidewall of each side member and the corresponding site on the inserted frame end has a slot which both lie in register and a resilient saddle member with a pair of protrusions is a spring fit over the joint member such that the protrusions enter the apertures and capture the frame member.

BRIEF DESCRIPTION OF THE DRAWINGS

The above is a general description of the invention, specific forms of which are now are now described by way of example with reference to the accompanying drawings in which:

FIG. 2 shows part of the joint member of FIG. 1;
FIG. 3 is a cross-section of the frame member of FIG. 1;
FIG. 4 is a cross-section on 4—4 of FIG. 2 showing the link retainer;
FIGS. 5a–d are plan views of various joint members;
FIGS. 6a–d are perspectives of various link members;
FIG. 7 is a plan view of an alternative joint member construction.

DESCRIPTION OF THE PREFERRED EMBODIMENTS

Figure 1:
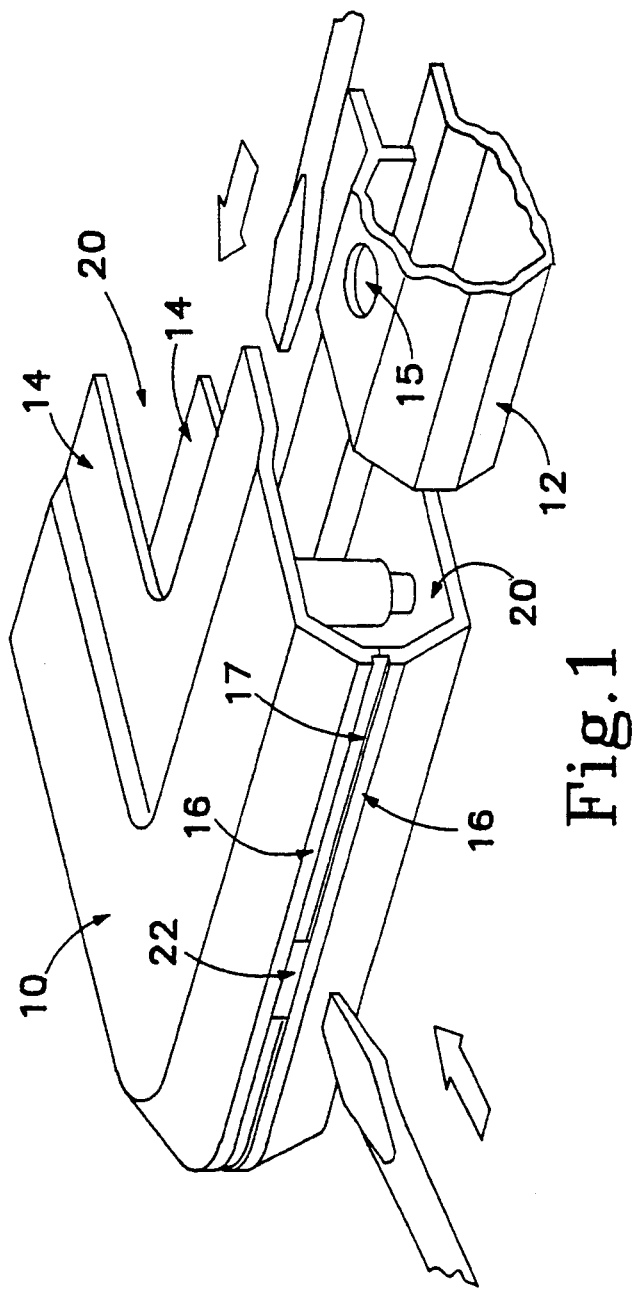
FIG. 1 is a diagrammatic view of part of a frame.

FIG. 1 shows a joint member 10 into which a frame member 12 has been inserted. The joint member is formed from a pair of side members 14 the edges 16 of which are inturned to meet at line 17. Together the side members form a substantially U-shaped cross-section.

The joint member 10 is formed in an L-shape so that the openings are at right angles to each other. An end of a respective frame member 12 can be inserted into each of the openings (only one shown). The inserted end abuts wall 13. The way in which the joint members close about the end of a frame member may also be understood from FIG. 2.

Within each of the cooperating edges 16 there is a gap 22 in which a link member 27 can be inserted as described later. In FIG. 2, extending inwardly from the side member are three hollow, cylindrical posts 24. The complementary side member has a similar set of posts, the one set being a friction fit on the other. The two joint members may be prised apart by a screwdriver inserted into gaps 22 when changes to the frame become necessary. The end of the frame member 12 has bores 15 which allow the posts 24 to pass through the frame member keeping it in contact with wall 13 and thereby retaining a square, stable frame.

Behind each gap 22 there is a small boss 26. A link member 27, inserted through the gap 22 is held in place by a plastic rivet passing through a hole 32 in the link member 27, and into boss 26. Link member 27 joins the joint member 14 to a like joint member, allowing two frames to be connected together. When the user expects that a change in frame arrangement will be made on a particular job the following variant is used.

Referring to FIG. 4 a snap lock bush 31 made of acetal is placed over boss 26. The bush has a projection with an upstanding tooth 33. When a link member 27 is inserted into the gap 28, the leading tongue will ride between walls 34 deflecting the tooth until it snaps firstly into large hole 32 and finally small hole 35. The free tongue of the link can then be inserted into another joint member. The acetal resistance is not so high as to prevent the removal of the link members and their reintroduction without disturbing the corner or other joints. Accordingly much time is saved when rearranging assemblies.

In FIG. 3 is seen the frame member extrusion in enlarged section with the line of weakness 36 to improve the flexing which permits close contact with both sides of any panel fitted into the frame. A board ledge 37 ensures the board rests square in the frame member. For framing notices or artwork it is useful once the size has been worked out and the frame members cut, to assemble the two half frames and to mount one half with two screws 29 (see FIG. 2) put through bosses 26. The other half frame is then pressed on thereby hiding the screws.

In FIG. 5 four variations of joint members are shown. FIGS. 5a–5d illustrate joint members that differ from the L-shaped joint member shown in FIG. 1 primarily in shape. The joint members shown in FIGS. 5a–5d are, respectively, X, T, Y and V shaped.

FIG. 6 shows alternative shapes of link member 27 in the form of a U section hinge formed using hinge element 38 (FIG. 6a), and an X shape (FIG. 6b) and a T shape (FIG. 6c) made from half jointed strips 39 which may slot into central hubs 40. These alternative link shapes allow construction of more elaborate assemblies.

In FIG. 7 slots 42 are punched in the sidewalls of joint member 10. Corresponding slots 43 are punched in the frame member 12. A resilient clip 44 is designed to straddle the joint member and introduce protrusions 45 into both slots when they lie in register. In a non-illustrated variation the joint members are not joined by friction fit posts but by countersunk fasteners which extend into the member but are covered by a clip in similar manner to that described above.

Figure 8:
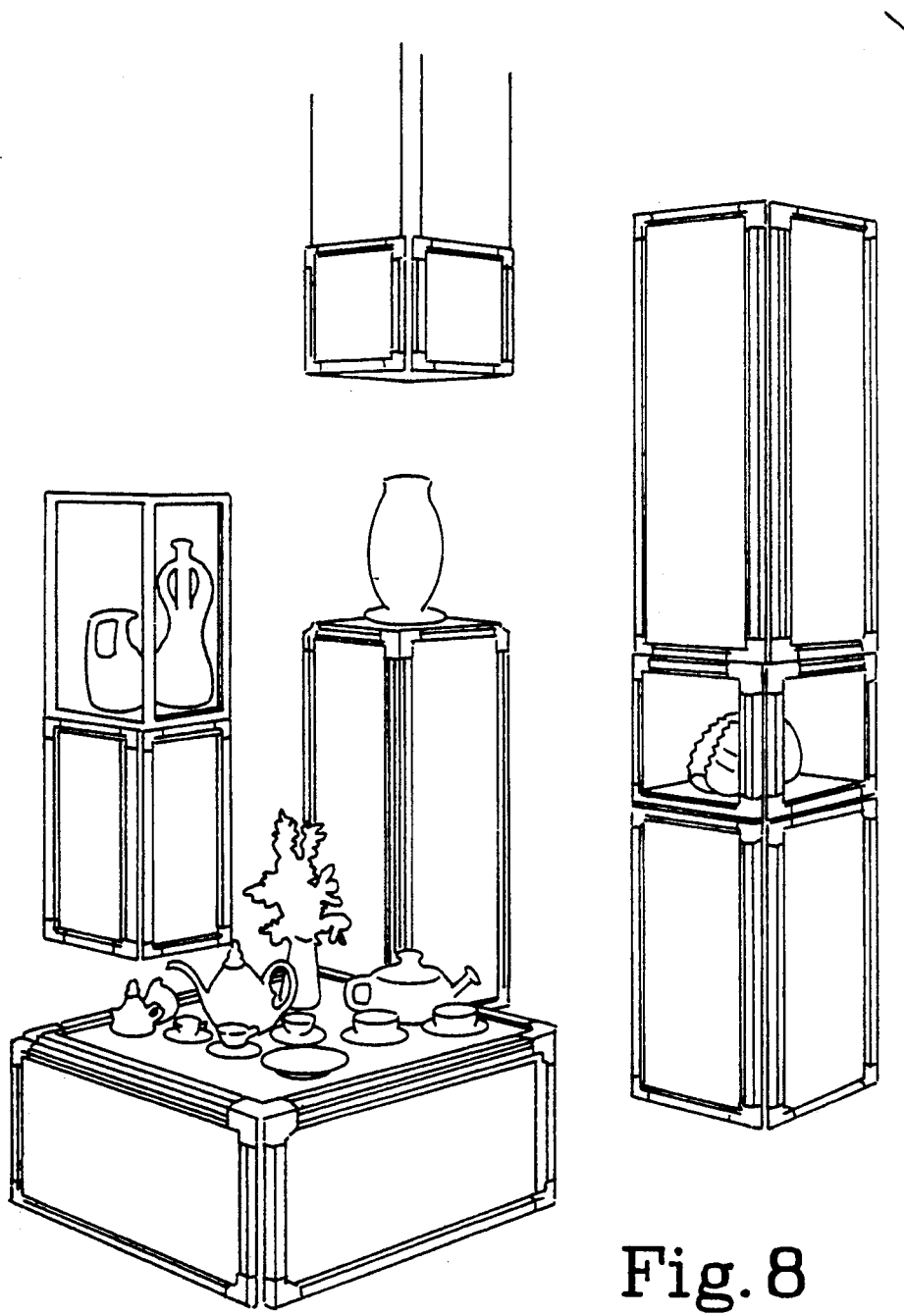
FIG. 8 shows various framework assemblies.

A selection of assemblies are shown in FIG. 8 which can be assembled from rectangular frames and link members. Diamonds and other polygons for creating special effects will suggest themselves to those skilled in the art.

The invention accommodates panel thicknesses of 0.2–50 mm. The advantages include assembly without tools, portability, no limit to size, addition and rearrangement of frames without the need to open the joints, assemblies can be folded down to single panel size for transport or storage; variety of colour, texture and finish

We claim:

1. A joint member for joining together two frame members, the joint member comprising a pair of similarly shaped side members arranged substantially parallel to each other, each side member having at least one inturned edge so that the inturned edges of the two side members mutually engage, one end edge of one side member cooperating with the corresponding end edge of the other side member to form a first opening into which an end of an elongate frame member is insertable; a second end edge of said one side member at an opposite end of the joint member cooperating with the corresponding end edge of said other side member to form a second opening for an end of a second elongate frame member, the side members cooperating with each other to form means for receiving and locating each frame member when the member has been inserted; and wherein at least one of the side members has a gap in the inturned edge to enable a link member to be inserted into the joint member in order to link it to a second joint member and there is a link receptor behind the gap within the joint member.

2. A joint member as claimed in claim 1 wherein the link receptor comprises a link guide, a link support and a link stop.

3. A joint member as claimed in claim 2 wherein the link support is capable of receiving a link pin which passes through the link.

4. A joint member as claimed in claim 2 wherein the link support is capable of receiving a fastener which pierces the side member and optionally the link also and pierces a support surface enabling the joint member to be mounted.

5. A joint member as claimed in claim 4 wherein the link guide is a pair of transverse walls between which the link is constrained to enter and leave at 90 degrees to the inturned edge.

6. A joint member as claimed in claim 5 wherein the link support is a boss, and the retainer has a part which embraces the boss and a resilient arm which carries a tooth adapted to engage a complementary part of the link thereby preventing unintended retraction.

7. A joint member as claimed in claim 4 wherein the link support is capable of receiving a link retainer, the retainer being of a material with memory having a part intended to engage the link support and a part which deflects out of the path of the incoming link and retains the link until the link is retracted to deflect the retainer, such insertion and removal being possible while the joint member remains closed.

8. A joint member as claimed in claim 1 wherein the side members are L-shaped, T-shaped, X-shaped Y-shaped or V-shaped.

9. A joint member as claimed in claim 1 wherein the link comprises a first tongue for insertion into another joint member.

10. A joint member as claimed in claim 9 wherein the link is a flexible hinge permitting articulation between two joint members.

11. A joint member as claimed in claim 9 wherein the link is a rigid joiner of Y,T,X or straight section.

12. A joiner as claimed in claim 11 wherein each tongue defines at least one bore which is engageable by protrusions or screws with the joint member.

13. A joint member for joining together two frame members, the joint member comprising a pair of similarly shaped side members arranged substantially parallel to each other, each side member having at least one inturned edge so that the inturned edges of the two side members mutually engage, one end edge of one side member cooperating with the corresponding end edge of the other side member to form a first opening into which an end of an elongate frame member is insertable; a second end edge of said one side member at an opposite end of the joint member cooperating with the corresponding end edge of said other side member to form a second opening for an end of a second elongate frame member, the side members cooperating with each other to form means for receiving and locating each frame member when the member has been inserted; and wherein each of the side members has an aperture near each end edge and the inserted frame members each have an aperture near the inserted ends such that when inserted into the open ends the pair of apertures in the side member lie in register with the pair of apertures in the inserted end of the frame member and a resilient saddle member with a pair of protrusions is a spring fit over the joint member such that the protrusions enter the apertures and capture the frame member.

* * * * *